United States Patent
Fleischman et al.

(10) Patent No.: US 11,379,887 B2
(45) Date of Patent: Jul. 5, 2022

(54) METHODS AND SYSTEMS FOR VALUING PATENTS WITH MULTIPLE VALUATION MODELS

(71) Applicant: INTERNATIONAL BUSINESS MACHINES CORPORATION, Armonk, NY (US)

(72) Inventors: Thomas J. Fleischman, Poughkeepsie, NY (US); Sue Hallen, Elk Grove Village, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 406 days.

(21) Appl. No.: 16/054,739

(22) Filed: Aug. 3, 2018

(65) Prior Publication Data
US 2020/0043060 A1    Feb. 6, 2020

(51) Int. Cl.
*G06Q 30/02* (2012.01)
*G06F 16/28* (2019.01)
*G06F 16/2455* (2019.01)

(52) U.S. Cl.
CPC ..... *G06Q 30/0278* (2013.01); *G06F 16/2455* (2019.01); *G06F 16/285* (2019.01)

(58) Field of Classification Search
CPC .. G06F 16/2455; G06F 16/285; G06F 16/951; G06Q 30/0278; G06Q 50/10
USPC .......................................................... 705/319
See application file for complete search history.

(56) References Cited

U.S. PATENT DOCUMENTS

| | | | |
|---|---|---|---|
| 5,361,201 A * | 11/1994 | Jost | G06Q 40/02 705/35 |
| 7,480,640 B1 | 1/2009 | Elad et al. | |
| 2002/0174081 A1* | 11/2002 | Charbonneau | G06Q 40/04 706/15 |
| 2004/0181427 A1* | 9/2004 | Stobbs | G06Q 50/184 705/36 R |
| 2006/0036453 A1* | 2/2006 | Williams | G06Q 10/00 705/1.1 |

(Continued)

OTHER PUBLICATIONS

Wu, Han and Enhong Chen, "Patent Quality Valuation with Deep Learning Models," in book, Database Systems for Advanced Applications, pp. 474-490, published May 2018, available at: < https://www.researchgate.net/publication/325095155_Patent_Quality_Valuation_with_Deep_Learning_Models > (Year: 2018).*

(Continued)

*Primary Examiner* — Richard W. Crandall
(74) *Attorney, Agent, or Firm* — Griffiths & Seaton PLLC (57) ABSTRACT

Embodiments for valuing patents by one or more processors are described. A plurality of patents are analyzed with a first patent valuation model and at least a second patent valuation model. A selection of a filter of the results of said analysis of the plurality of patents with the first patent valuation model and the at least a second patent valuation model is detected. A list of some of the plurality of patents is generated based on said analysis of the plurality of patents with the first patent valuation model and the at least a second patent valuation model and the selected filter of the results of said analysis of the plurality of patents with the first patent valuation model and the at least a second patent valuation model.

21 Claims, 7 Drawing Sheets

(56) References Cited

U.S. PATENT DOCUMENTS

| | | | | |
|---|---|---|---|---|
| 2007/0150298 | A1* | 6/2007 | Barney | G06Q 40/06 |
| | | | | 705/306 |
| 2012/0317040 | A1 | 12/2012 | Shaffer | |
| 2013/0282599 | A1 | 10/2013 | Kang et al. | |
| 2014/0279695 | A1 | 9/2014 | Hsu et al. | |
| 2015/0206069 | A1* | 7/2015 | Beers | G06K 9/6262 |
| | | | | 706/13 |
| 2015/0331585 | A1* | 11/2015 | Stading | G06F 16/313 |
| | | | | 715/810 |

OTHER PUBLICATIONS

Noyes, 5 things you need to know about A.I.: Cognitive, neural and dep, oh my! Computerworld [online], published Mar. 3, 2016, available at: < https://www.computerworld.com/article/3040563/5-things-you-need-to-know-about-ai-cognitive-neural-and-deep-oh-my.html > (Year: 2016).*

Rutkowski et al., "Cognitive Analysis Techniques in Business Planning and Decision Support Systems," Artificial Intelligence and Soft Computing—ICAISC 200, Conference in Zakopane, Poland, Jun. 2006 Proceedings, Springer, pp. 1027-1039. (Year: 2006).*

"Build a neural network in 7 steps," [online], available at: < https://www.neuraldesigner.com/learning/user-guide/design-a-neural-network > (Year: 2021).*

* cited by examiner

METHODS AND SYSTEMS FOR VALUING PATENTS WITH MULTIPLE VALUATION MODELS

BACKGROUND OF THE INVENTION

Field of the Invention

The present invention relates to various embodiments for valuing patents with multiple patent valuation models.

Description of the Related Art

Current models, or methods, used to value (or predict or estimate the value of) patents typically use a set of parameters considered to be relevant to effectively calculate a rating value, which may then be used in future processes. Attempting to utilize a single model to predict patent values usually may be problematic in several ways.

For example, the model may have too many parameters, resulting in a vague or too general list, or the model may have too few parameters, resulting in a very narrow view of value. Additionally, the model may never be fully completed, as model creators are constantly attempting to negotiate the parameter values as they see them. Further, attempts to utilize a single model for different purposes (e.g., defensive, offensive, independent of end use, etc.) may result in a mismatch between the list of patents generated and the particular need at the time. It is believed by some that no one, single model is ideal.

SUMMARY OF THE INVENTION

Various embodiments for valuing patents by one or more processors are described. In one embodiment, by way of example only, a method for valuing patents, again by one or more processors, is provided. A plurality of patents are analyzed with a first patent valuation model and at least a second patent valuation model. A selection of a filter of the results of the analysis of the plurality of patents with the first patent valuation model and the at least a patent valuation model is detected. A list of at least some of the plurality of patents is generated based on the analysis of the plurality of patents with the first patent valuation model and the at least a second patent valuation model and the selected filter of the results of the analysis of the plurality of patents with the first patent valuation model and the at least a second patent valuation model.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, current models, or methods, used to value (or predict, estimate, calculate, or determine the value of) patents (and/or identify patents that may be relevant to, for example, potential litigation) typically use a set of parameters considered to be relevant to effectively calculate a rating value, which may then be used in future processes. Attempting to utilize a single model to predict patent values usually may be problematic in several ways.

For example, the model may have too many parameters. In such an instance, the results of the search may include an undesirably high number of patents, as the search is performed in a relatively vague or general manner. Similarly, the model may have too few parameters, which may result in a small number of results, as the search is performed with a relatively narrow view. Additionally, the model may never be fully completed, as model creators are constantly attempting to negotiate the parameter values as they see them. Further, attempts to utilize a single model for different purposes (e.g., defensive, offensive, independent of end use, etc.) may result in a mismatch between the list of patents generated and the particular need at the time.

For at least these reasons, it is believed by some that no one, single model is ideal. More particularly, because each model utilizes a set of parameters intended to determine the value patents and/or identify patents with respect to a particular situation, it may be argued that none of the individual valuation models that are currently available are suitable in all circumstances.

To address these needs, some embodiments described herein provide methods and systems for valuing patents and/or searching for relevant patents that utilize a "combinational" approach of multiple patent valuation models. In some embodiments, the valuation models utilized may be selected by the user, as well as modified by the user, and the results of the valuation may be selectively filtered by the user. The methods and systems described herein may aid in predicting the value of patents by utilizing "group sourced" evaluations and relationships, as may be facilitated by the use of multiple patent valuation models. In other words, in some embodiments, a "consolidation" of multiple patent valuation models is provided, allowing for advanced patent valuation and/or analysis, via what may be considered new valuation models and tools.

As described in greater detail below, in some embodiments, more than one patent valuation model may be utilized to provide patent valuations and/or searches that utilize multiple manners for determining valuations. In some embodiments, the particular patent valuation models utilized may be selected from a "library" of multiple models (i.e., the models utilized may be customized). The results provided by the methods and systems described herein may be filtered in various ways. For example, the results provided to the user may include only the patents that were identified by more than one of the models utilized (e.g., a converging list) or only that patents that were identified by only one of the models (e.g., a diverging list).

Additionally, in some embodiments, the models utilized may be modified with respect to, for example, the particular parameters used, the "weighting" provided to the parameters, and/or the weighting provided to each valuation model (e.g., provide the results from one model with a relatively high valuation compared to the results of another model). Further, in some embodiments, the particular configuration (e.g., combination of models, altered parameters, etc.) may be stored for future use, thereby essentially allowing for the creation of new valuation models.

According to some embodiments described herein, a cognitive analysis or cognitive neural network system may (also) be utilized. For example, cognitive analysis may be utilized to analyze the patent types, recognize previous successful model combinations, and provide recommendations to the user(s). Additionally, cognitive analysis may be utilized to analyze the patents for common parameters not identified/utilized by the selected models and suggest additional parameters to be used in a new model. Further, cognitive analysis may be utilized to monitor materials (e.g., news sources, published documents, etc.) related to the particular industry (e.g., semiconductor processing, telecommunications, automotive, aerospace, etc.), tracking new models and recommending applications, leveraging changes in industry approaches and success in patent valuation.

The cognitive analysis may include classifying natural language, analyzing tone, and analyzing sentiment (e.g., scanning for keywords, key phrases, etc.) with respect to, for example, the keywords, key phrases, etc. found in patents. Over time, the methods and systems described herein may determine correlations (or insights) that allow for an improvement in the valuations and/or identifying of patents, perhaps with feedback provided by users, that allows for the performance of the system to improve with continued use.

As such, in some embodiments, the methods and/or systems described herein may utilize a "cognitive analysis," a "cognitive neural network," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the valuation and/or identification of patents. Utilizing the models, the performance (or operation) of the system (e.g., utilizing/based on new inputs) may be predicted and/or the performance of the system may be optimized by investigating how changes in the input(s) effect the output(s).

In particular, in some embodiments, a method, by one or more processors, for valuing patents is provided. A plurality of patents are analyzed with a first patent valuation model and at least a second patent valuation model. A selection of a filter of the results of the analysis of the plurality of patents with the first patent valuation model and the at least a second patent valuation model is detected. A list of at least some of the plurality of patents is generated based on the analysis of the plurality of patents with the first patent valuation model and the at least a second patent valuation model and the selected filter of the results of the analysis of the plurality of patents with the first patent valuation model and the at least a second patent valuation model.

The results of the analysis of the plurality of patents may include a first set of the plurality of patents associated with the first patent valuation model and at least a second set of plurality of patents associated with the at least a second patent valuation model.

The selected filter may cause the generated list of the at least some of the plurality of patents to include only those of the plurality of patents that are included in both of the first set of the plurality of patents and the at least a second set of the plurality of patents. The selected filter may cause the generated list of the at least some of the plurality of patents to include only those of the plurality of patents that are included in only one of the first set of the plurality of patents and the at least a second set of the plurality of patents.

A selection of the first patent valuation model and the at least a second patent valuation model from a plurality of patent valuation models may be detected. The first patent valuation model may utilize a first set of parameters, and the at least a second patent valuation model may utilize at least a second set of parameters. At least one of the first set of parameters and the at least a second set of parameters may be modified before the analyzing of the plurality of patents with the first patent valuation model and the at least a second patent valuation model.

A new (e.g., additional, third, fourth, etc.) patent valuation model may be created based on first patent valuation model, the at least a second patent valuation model, and the modified at least one of the first set of parameters and the at least a second set of parameters. The new patent valuation model may be stored. A second plurality of patents may be analyzed with the new patent valuation model.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
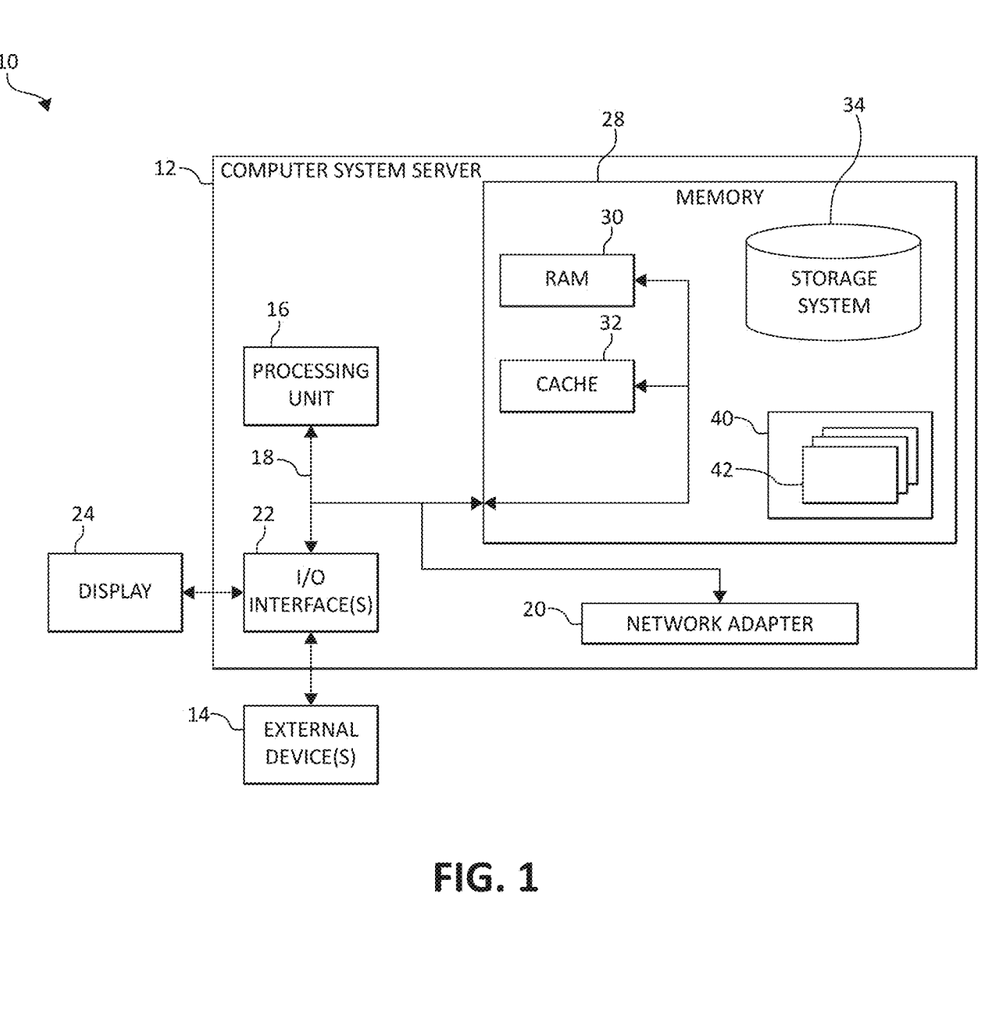
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
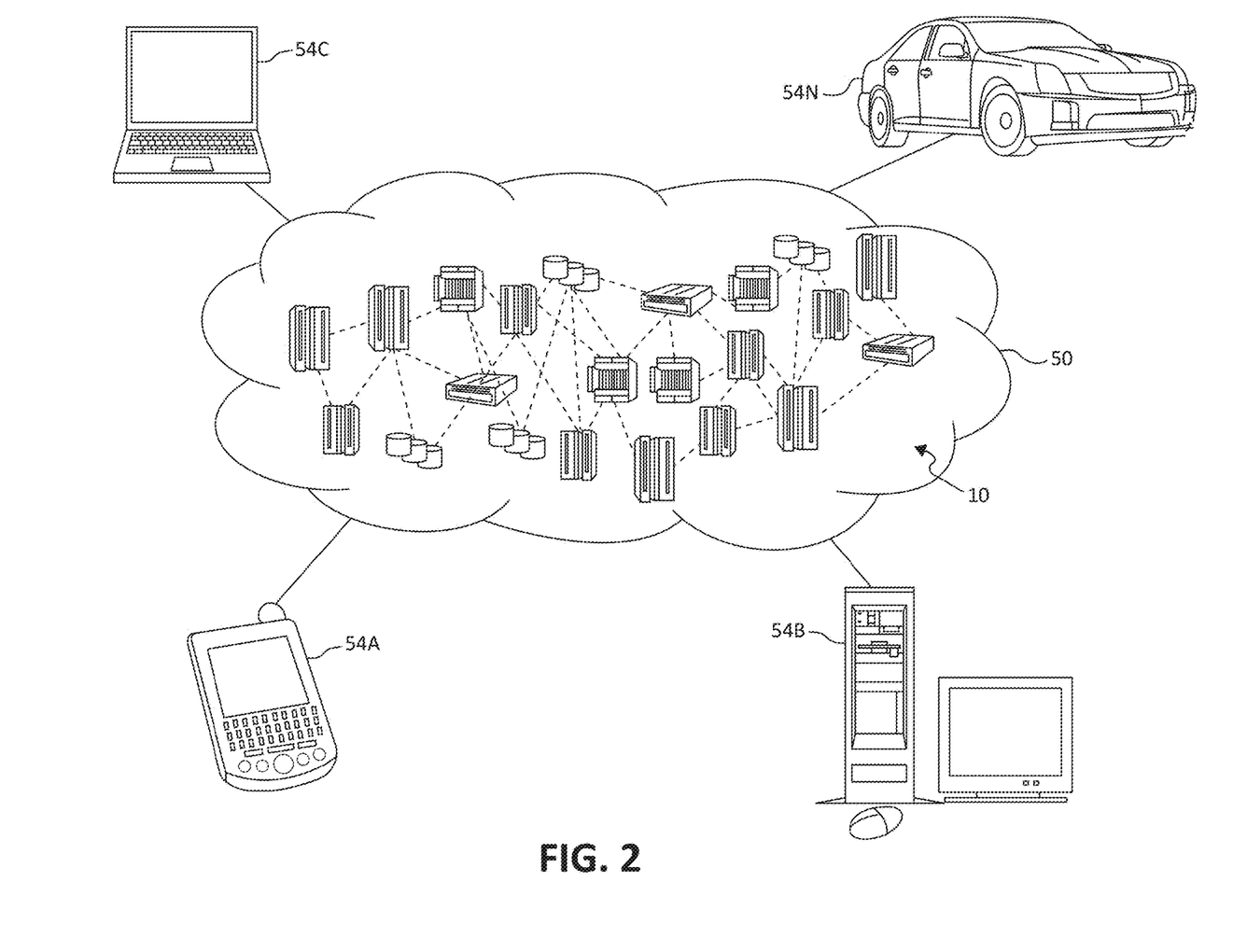
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, and vehicles (e.g., automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
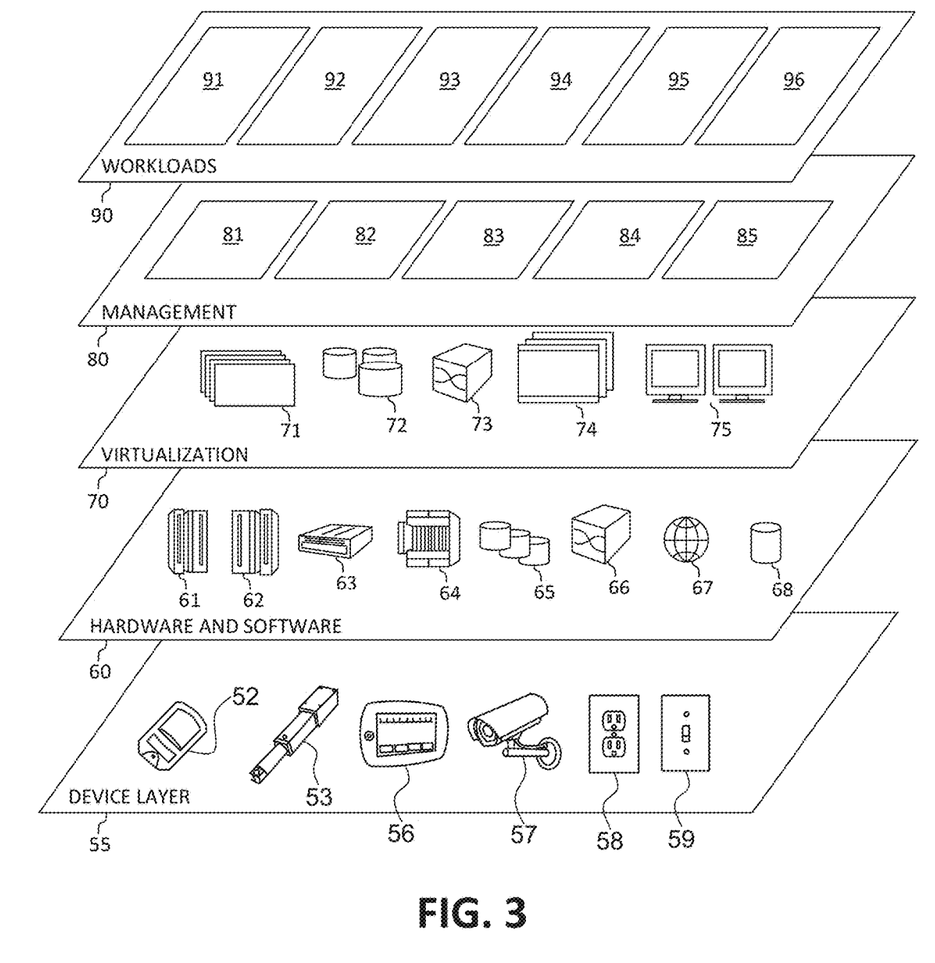
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for valuing, identifying, and/or analyzing patents as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As mentioned above, in some embodiments, more than one patent valuation model may be utilized to provide patent valuations and/or perform searches that utilize multiple manners for determining patent valuations. In some embodiments, the particular patent valuation models utilized may be selected from a "library" of multiple models (i.e., the models utilized may be customized). The results provided by the methods and systems described herein may be filtered in various ways. For example, the results provided to the user may include only the patents that were identified by more than one of the models utilized (e.g., a converging list) or only that patents that were identified by only one of the models (e.g., a diverging list).

Figure 4:
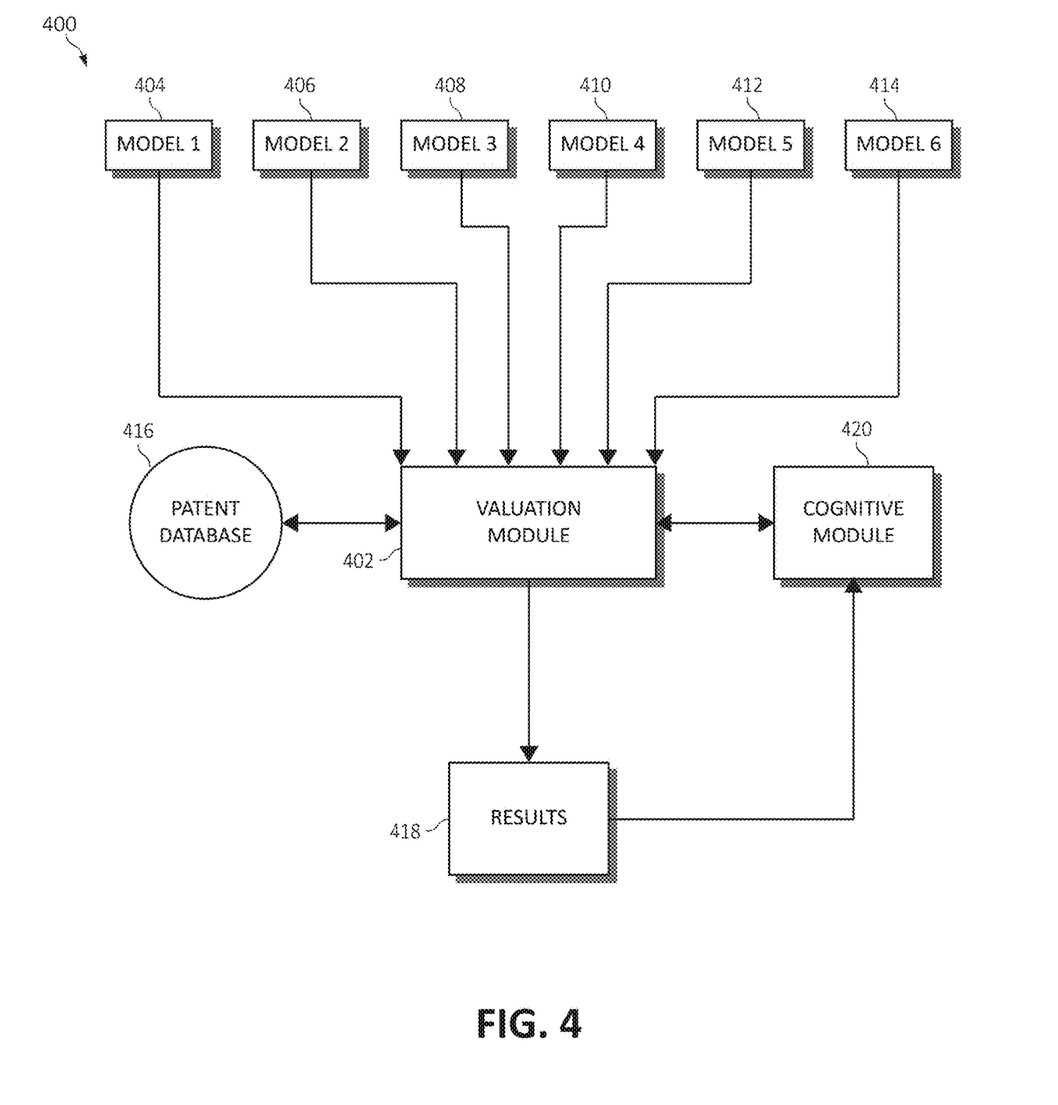
FIG. 4 is a block diagram of a system for valuing patents according to an embodiment of the present invention.

FIG. 4 is a block diagram of a system 400 according to some embodiments described herein. The system includes a patent valuation module (or valuation module) 402 that may be implemented and/or used on an suitable computing node, such as those described above, which is configured to perform the methods described herein. As described herein, a computing node may refer to any computing device, such as those described above (e.g., desktop PC, mobile electronic device, etc.), and/or a software application installed on a computing device (e.g., a web browser or other application).

The valuation module 402 receives (or retrieves, has access to, is in operable communication with, etc., such as through the Internet) multiple patent valuation models (or valuation models or methods) 404-414 (i.e., models 1-6) and a patent database 416. Although the depicted embodiment shows six valuation models 404-414, it should be understood that other embodiments may utilize and/or have access to a different number of models. As shown in FIG. 4, the valuation module 402 outputs (or creates or generates) results 418 (e.g., one or more lists of patents), as described in greater detail below. In the depicted embodiment, the system 400 also includes a cognitive module 420, which is configured to perform cognitive analysis as described herein. The cognitive module 420 may be implemented within the same computing system as the valuation module 402 or in a separate computing system (e.g., local or remote).

As will be appreciated by one skilled in the art, the valuation models 404-414 may be any patent valuation model (or method) available, which may be created, published, and/or made available by any party (e.g., individuals, organizations, etc.). Examples of valuation models include, but are not limited to, models that rank patents based on citations (e.g., the number of forward citations) with or without self citations removed, divided by the age of the patent, to indicate average number of citations per year, models that use the number of related/similar patents that have been used in litigation and perhaps increase the rating if the patent (or a related patent) was used or if it was included in a citation (forward or backward) to any patents used in litigation, models based on the number of forward citations and/or the number of backward citations, models based on the length (e.g., word count) of the first claim, as well as models based on any combination of such factors (e.g., the number of claims, length of prosecution, age, classification, etc.).

The patent database 416 may include any suitable collection of patents to be valued and/or searched, which may be stored on any suitable storage medium. For example, the patent database 416 may include a particular collection or group of patents (e.g., the portfolio(s) of a particular business(es)), a more general collection (e.g., patents related to a particular industry), or a large database that includes patents from multiple industries.

In some embodiments, a user may be provided with a manner to select from (e.g., select two or more of) the different valuation models 404-414 (and/or add to the available valuation models), such as via a user input device (e.g., a mouse, keyboard, etc.) and/or a computing device, to be used in a patent valuation and/or search, as described herein. In some embodiments, the user may enter and/or adjust the parameters used by each of the selected valuation models 404-414 and/or enter and/or adjust the "weighting" of the parameters of valuation models 404-414. In instances in which the parameters are adjusted, the changes may be saved or stored (e.g., on a local or remote memory) as a "new" valuation model. Such newly created models may be made available for use through local systems (and/or to local users) or may be shared with and/or sent to other users. In some embodiments, the user may also adjust the weighting of the models themselves.

In some embodiments, the cognitive module 420 may perform analytics utilizing, for example, new sources related to particular industries (e.g., regarding litigation, acquisitions, recent history, etc.) and perhaps generate new valuation models and/or recommend specific models to be used. The models 404-414 may be presented to the user in an ordered list (e.g., ordered with respect to frequency used, reviews/ratings, etc.) and/or may be grouped regarding the most common use or purpose for analysis (e.g., defensive, offensive, new product development, etc.).

In some embodiments, the system 400 provides an interactive tool or model to analyze patents, or a list of group thereof, such as those available in the patent database 416, using multiple models (e.g., those selected from models 404-414). The results 418 may provide patents or one of more lists of patents in various ways, such as converging lists, diverging lists, combined models, an overall list, etc. For example, with respect to converging lists, the results 418 may include a list of patents that are selected or identified by more than one of the selected models. Diverging lists may include a list of patents that are not selected or identified by any of the selected models, or a list of patents that are only identified by one of the selected models but not the others. Combined models may result in a list of patents that are identified by several of the models (e.g., the patents identified by a first model and those identified by a second model), which may be selected/controlled by the user. Overall lists may include rankings of the patents based on the number of models the patents are identified/selected by and/or how highly the patents are ranked by those models. Additionally, in some embodiments, the results 418 may (also) include an identification of the parameters that cause the differences with respect to the results of different lists (e.g., converging, diverging, etc.). In some embodiments, the results 418 may simply include a text-based (or alphanumeric) list of the appropriate patents and/or a graphical representation thereof, such as bar graphs/charts, "heat" maps, etc. (an example of which is described below).

Additionally, in some embodiments, the resulting list(s) of patents may be further analyzed or sorted. For example, a more particular list of converging patents may be generated, such as a final, ranked patent list that is based both on the identification of patents by several of the models as well as their ranking within each list, or an identification of patents common across certain ranking ranges (e.g., quartiles). An identification of the most highly ranked patents and/or lowest ranked patents, as determined by the identification and/or ranking thereof by several models, may (also) be provided. An identification and creation of diverging lists of patents, such as the identification of patents ranked at opposite extremes by different models (and/or users), may (also) be provided. Further, additional rankings and/or identifications may be provided (e.g., using internal or user specific preferences), such as based on the use of patents in litigation, the presence of specific, highly rated patents (e.g., "golden patents"), etc.

As one example of aspects of a patent valuation process described herein, a set of patents (e.g., one hundred patents) may be selected to be analyzed (or valued or searched through). Each of the selected valuation models may rank each of the patents using its own criteria and parameters and generate a suitable sorted list. The user may (previously) select a model weighting or priority (e.g., start with model 1, then model 2, etc.) for list generation. The user may then request that the system identifies patents that are determined to be ranked relatively high by all models utilized (e.g., ranked in the top ten in both lists). The system may then average the rankings and select a particular number of the patents (e.g., the top ten). Percentages versus actual counts may also be used, as well as the "best match" and "best mismatch" that can be extracted from the different models.

As another example of a patent valuation process described herein, several lists of patents may be provided (e.g., generated by valuation models). The system may analyze the lists separately, automatically identify patents in common across the different lists, and rank the patents with respect to, for example, the number of the lists in which each patent appears, as well as identify and patents that only appear on one of the lists. The user may be able to weight each list and use additional valuation models and/or preferences to select the appropriate lists and/or patents thereon. The user may be provided with indications of which patents, if any, are common across different lists (e.g., all lists, particular lists, user-selected lists, etc.) Once a desired result is obtained, the various settings (e.g., models utilized, parameters, etc.) may be saved as a new model and used in the future (e.g., by the same user and/or shared to other users).

Figure 5:
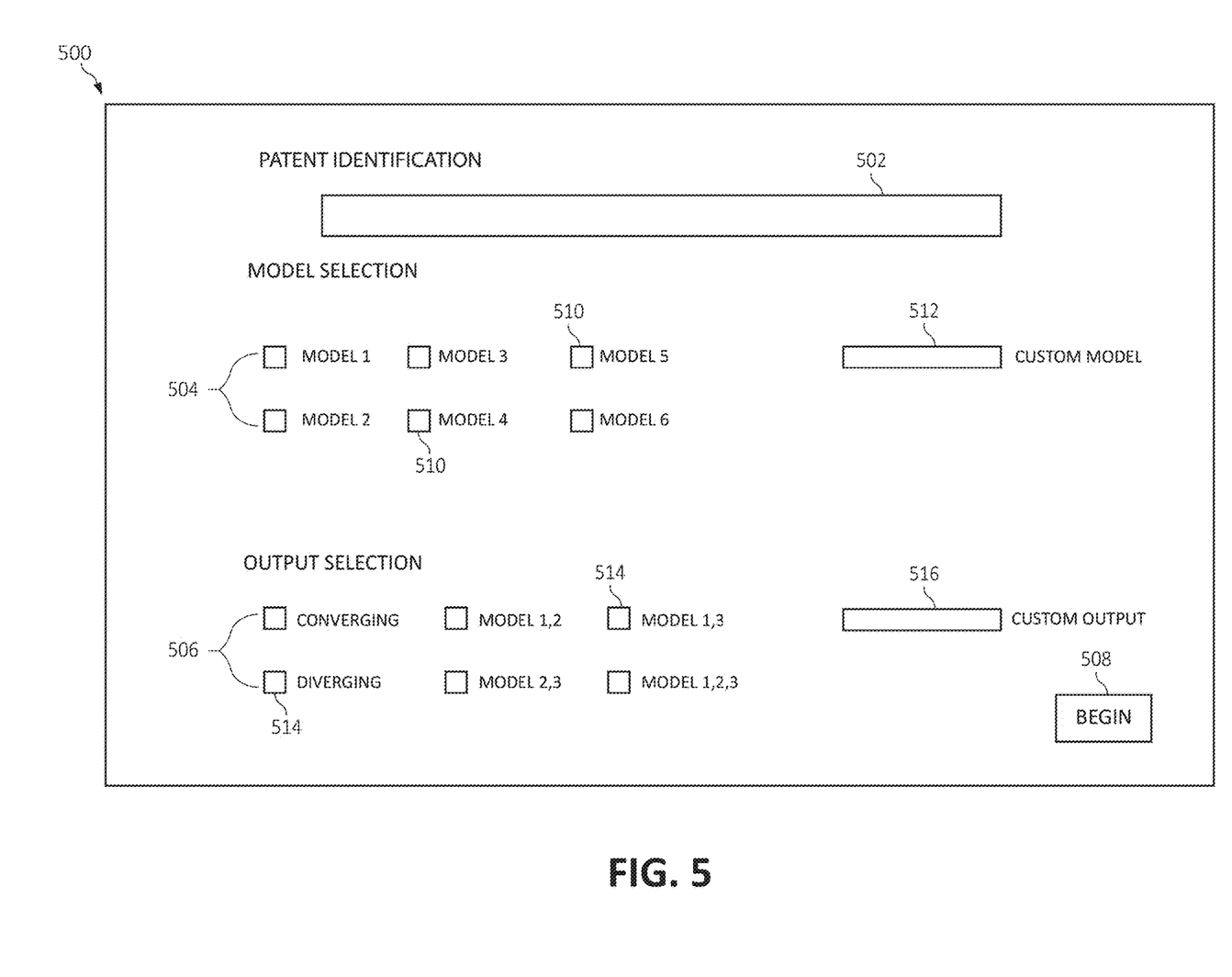
FIG. 5 is a plan view of a user interface for a system for valuing patents according to an embodiment of the present invention.

FIG. 5 illustrates an exemplary user interface (e.g., graphical user interface (GUI)) 500 according to some embodiments of the present invention. The user interface 500 may be renderer or displayed on a display device of a computing system and utilized by the user to control and/or interact with the systems described herein, such as that shown in FIG. 4, using, for example, a user input device (e.g., a keyboard, mouse, etc.). In the depicted embodiment, the user interface 500 includes a patent identification section 502, a model selection section 504, an output (or filter) selection section 506, and a begin (or initiate valuation/search) button 508.

The patent identification section 502 may include a text box or other user input mechanism (e.g., pull down menus, "links," etc.) which may be used by the user to identify the patents or groups of patens that are to undergo the valuation process and/or be searched. For example, the user may "click" on a portion of the patent identification section 502 and be presented with a list of groups of patents (e.g., related to a particular industry, owned by certain businesses, etc.). Additionally, in some embodiments, the user may (also) be able to provide keywords and/or key phrases (e.g., via keyboard, alphanumeric characters, etc.) which should be utilized to select patents to searched.

The model selection section 504 may be utilized by the user to select the patent valuation models to be used in the valuation process. For example, in the depicted embodiment, the model selection section 504 includes a listing of the available valuation models (e.g., models 1-6) with a "check box" 510 (e.g., which may be selected/activated/actuated by the user clicking on the box with a mouse/cursor) next to each, which when selected, causes the respective valuation model to be utilized in the valuation and/or search process. In some embodiments, the user may (also) select a custom valuation model (e.g., created by modifying the parameters of a previously created model, combining models, etc.). In the depicted embodiment, the model selection section 504 includes a custom model selector 512 that may include, for example, a text box (e.g., for inputting a name, location, etc. of the custom model) and/or a pull-down menu (e.g., including previously made custom models).

Still referring to FIG. 5, the output selection section 506 may be utilized by the user to "filter" the results (or select the output) of the valuation process. For example, in the depicted embodiment, the output selection section 506 includes a listing of various filters (e.g., converging, diverging, model 1,2, etc.) with a check box 514 (e.g., which may be selected/activated/actuated by the user clicking on the box with a mouse/cursor) next to each, which when selected, causes the respective filter be applied to the results of the valuation and/or search process. In some embodiments, the user may (also) select a custom filter (e.g., manually created by the user, previously created by another user, etc.). In the depicted embodiment, the output selection section 506 includes a custom filter selector 516 that may include, for example, a text box (e.g., for inputting a name, description, location, etc. of the custom filter) and/or a pull-down menu (e.g., including previously made custom filters).

The begin button 508 may be utilized by the user to initiate the valuation/search process after the selections/options described above are inputted. In some embodiments, the begin button 508 may be activated/actuated using any appropriate user input (e.g., clicking via a mouse, with a keyboard, etc.) and/or the valuation process may be initiated in other ways (e.g., short-cut keys, etc.).

Figure 6:
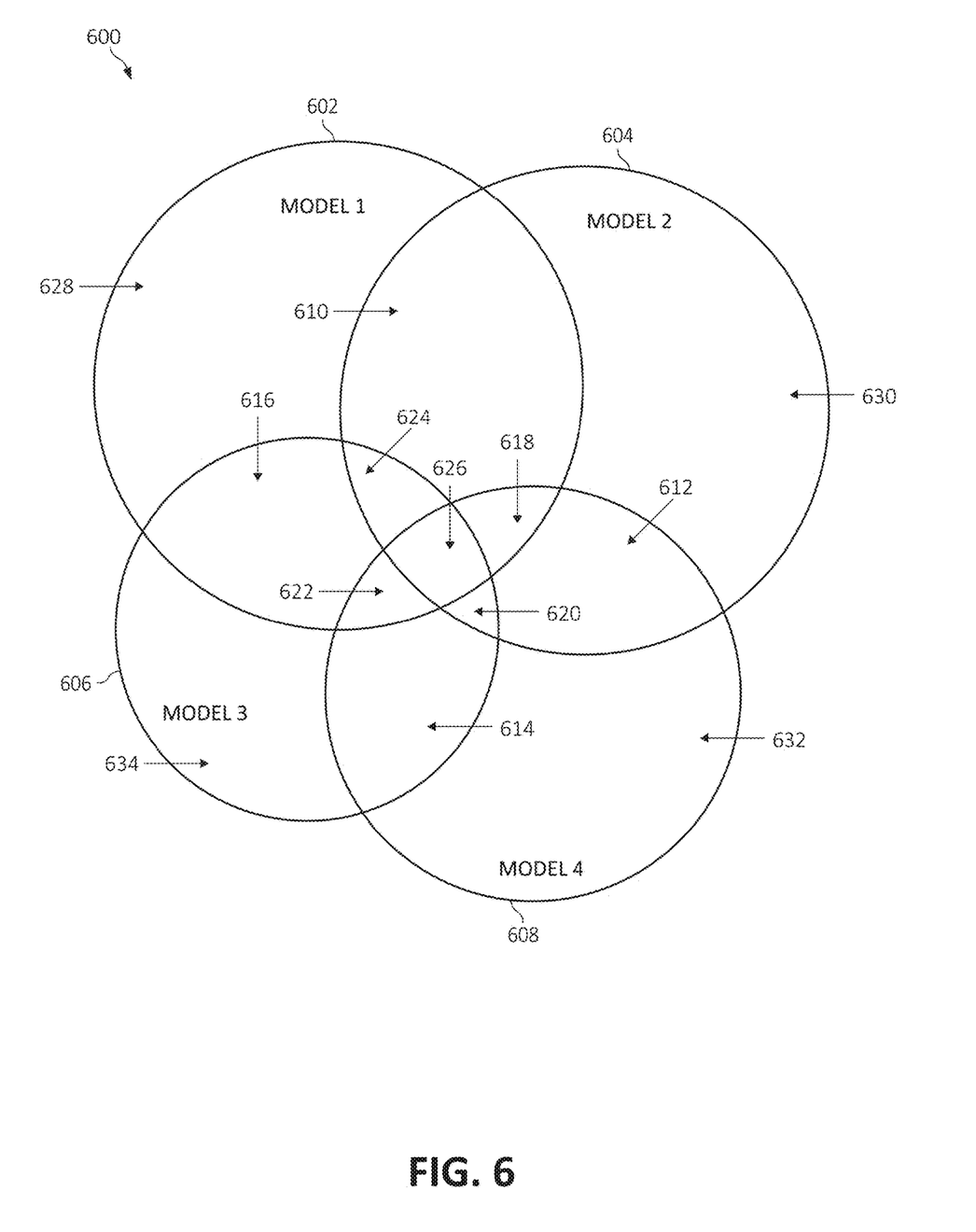
FIG. 6 is a graphical representation of results of a patent valuation process according to an embodiment of the present invention.

FIG. 6 illustrates a graphical representation of exemplary results 600 of a patent valuation and/or search according to some embodiments described herein. The results 600 shown in FIG. 6 may be considered to be provided simply to assist in understanding the methods and systems described herein. However, it should be understood that such a graphical representation may rendered (or displayed) on a display device of a computing system in some embodiments, perhaps in combination with one or more text-based lists of patents identified/selected by the patent valuation processes described herein. In the example shown in FIG. 6, the results 600 are shown as a series of circles (e.g., overlapping circles), similar to a "Venn diagram," but it should be understood that other graphical representations may be used, such as "trees," nested lists, heat maps, etc.

In the embodiment depicted in FIG. 6, the results 600 include circle 602 that corresponds to the patents (individually) identified by model 1, circle 604 that corresponds to the patents identified by model 2, circle 606 that corresponds to the patents identified by model 3, and circle 608 that corresponds to the patents identified by model 4. As such, for illustrative purposes, it may be assumed that models 1-4 (e.g., models 1-4 referenced above) were selected (e.g., by the user) to be utilized in the patent valuation process.

As shown, the circles 602-608 overlap, creating various overlapping regions 610-634, which may be understood to represent different groups of patents that were identified (or selected) by more than one of the models 1-4. In particular, in the example shown, regions 610-634 may represent patents identified by models 1-4 as follows: region 610 may represent patent identified by (only) model 1 and model 2; region 612 may represent patents identified by (only) model 2 and model 4; region 614 may represent patents identified by (only) model 3 and model 4; region 616 may represent patents identified by (only) model 1 and model 3; region 618 may represent patents identified by (only) model 1, model 2, and model 4; region 620 may represent patents identified by (only) model 2, model 3, and model 4; region 622 may represent patents identified by (only) model 1, model 3, and model 4; region 624 may represent patents identified by (only) model 1, model 2, and model 3; region 626 may represent patents identified by model 1, model 2, model 3, and model 4; and regions 628-634 may represent patents only identified by model 1, model 2, model 3, and model 4, respectively.

In embodiments in which a graphical representation of the results is rendered, the user may be able to interact with the results to, for example, filter the results (e.g., as an additional filter(s) if filters were previously selected). For example, still referring to FIG. 6, in some embodiments, the user may select (e.g., via a suitable user input device, such as a mouse and/or keyboard) one or more of the regions 610-634, which may cause a list of the corresponding patents to be generated and rendered.

Figure 7:
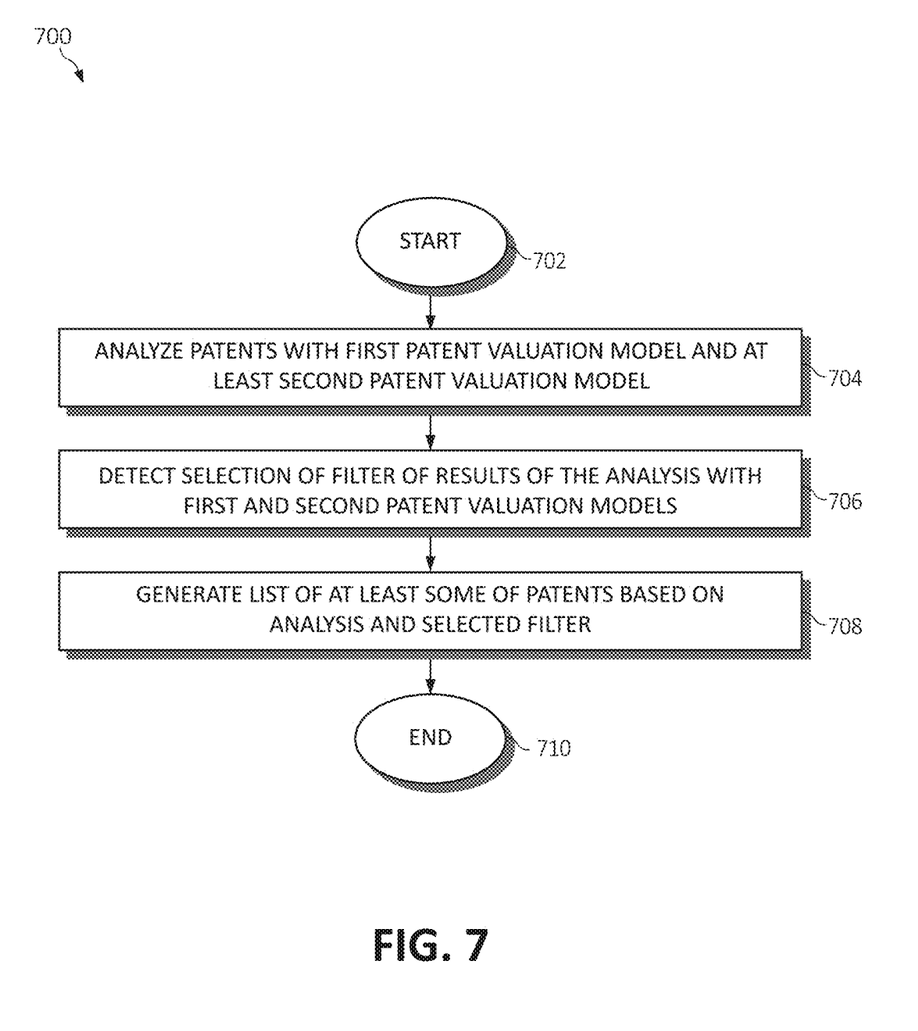
FIG. 7 is a flowchart diagram of an exemplary method for valuing patents according to an embodiment of the present invention.

Turning to FIG. 7, a flowchart diagram of an exemplary method 700 for valuing (or searching through, selecting, identifying, etc.) patents is illustrated. Method 700 begins (step 702) with, for example, the selection of a group (or plurality) of patents to undergo a valuation and/or search process (e.g., a patent portfolio of a business, patents related to a particular industry, etc.). The selection of the patents may be manually performed by a user or automatically performed by a computing system.

The patents are analyzed with (at least) a first patent valuation model and at least a second patent valuation model (e.g., a second, third, fourth, etc. patent valuation model) (step 704). The results of the analysis of the patents may include (at least) a first set of the patents associated with the first patent valuation model and at least a second set of patents associated with the at least a second patent valuation model (e.g., each of the sets of patents may be associated with and/or selected by a respective one of the patent valuation models utilized). A selection of the first patent valuation model and the at least a second patent valuation model from a plurality of patent valuation models may be detected. The first patent valuation model may utilize a first set of parameters, and the at least a second patent valuation model may utilize at least a second set of parameters (e.g., each of the patent valuation models used/selected may utilize a respective set of parameters). At least one of the first set of parameters and the at least a second set of parameters may be modified before the analyzing of the plurality of patents with the first patent valuation model and the at least a second patent valuation model (e.g., after the selection of the first and second patent valuation models).

A selection of a filter of the results of the analysis the patents with the first patent valuation model and the at least a second patent valuation model is detected (step 706). The filter may be selected manually by a user or automatically by a computing system (or at least a recommendation thereof may be provided by a computing system, such as through cognitive analysis).

A list of at least some of the patents is generated based on the analysis of the patents with the first patent valuation model and the at least a second patent valuation model and the selected filter of the results (step 708). The selected filter may cause, for example, the generated list of patents to include only those of the patents that are included in both of the first set of patents and the at least a second set of patents (e.g., a converging list). As another example, the selected filter may cause the generated list of patents to include only those of the patents that are included in only one of the first set of patents and the at least a second set of patents (e.g., a diverging list).

Method 700 ends (step 710) with, for example, the generated list of patents being provided to a user, such as by being rendered or displayed by a display device of a computing system. The generated list may be provided as a text-based list and/or via a graphical representation. A new (e.g., additional, third, etc.) patent valuation model may be created based on first patent valuation model, the at least a second patent valuation model, and/or the modified parameters thereof. The third patent valuation model may be stored, and a second group of patents may be analyzed with the third patent valuation model (e.g., if selected by the user).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for valuing patents comprising:
   receiving information associated with a particular industry from at least one data source, wherein the information corresponds to an analysis related to intellectual property of the particular industry;
   executing machine learning logic to utilize a neural network to recognize successful model combinations of a plurality of cognitive patent valuation models using the information as input, wherein utilizing the neural network includes analyzing each of the plurality of cognitive patent valuation models under a cognitive analysis of the neural network to determine and apply weighting parameters of each of the plurality of cognitive patent valuation models according to a predefined input goal, and wherein an output of the neural network is a ranked list of the plurality of cognitive patent valuation models according to the predefined input goal;

analyzing a plurality of patents with a first patent valuation model and at least a second patent valuation model of the plurality of cognitive patent valuation models selected from a library of computer models containing the plurality of cognitive patent valuation models, wherein the first patent valuation model has a first number of the parameters respectively weighted at a first weight and the at least a second patent valuation model has a second number of the parameters respectively weighted at a second weight, the second number different than the first number and the second weight different than the first weight;

detecting a selection of a filter of the results of said analysis of the plurality of patents with the first patent valuation model and the at least a second patent valuation model;

generating a list of at least some of the plurality of patents based on said analysis of the plurality of patents with the first patent valuation model and the at least a second patent valuation model and the selected filter of the results of said analysis of the plurality of patents with the first patent valuation model and the at least a second patent valuation model; and using feedback data associated with the list of at least some of the plurality of patents to automatically and iteratively update the neural network over time to improve an accuracy of the neural network in recognizing the successful model combinations of the plurality of cognitive patent valuation models.

2. The method of claim 1, wherein the results of said analysis of the plurality of patents includes a first set of the plurality of patents associated with the first patent valuation model and at least a second set of the plurality of patents associated with the at least a second patent valuation model.

3. The method of claim 2, wherein the selected filter causes the generated list of the at least some of the plurality of patents to include only those of the plurality of patents that are included in both of the first set of the plurality of patents and the at least a second set of the plurality of patents.

4. The method of claim 2, wherein the selected filter causes the generated list of the at least some of the plurality of patents to include only those of the plurality of patents that are included in only one of the first set of the plurality of patents and the at least a second set of the plurality of patents.

5. The method of claim 1, further comprising detecting a selection of the first patent valuation model and the at least a second patent valuation model from the plurality of cognitive patent valuation models.

6. The method of claim 1, wherein the first patent valuation model utilizes a first set of the parameters, and the at least a second patent valuation model utilizes at least a second set of the parameters, and further comprising modifying at least one of the first set of the parameters and the at least a second set of the parameters before the analyzing of the plurality of patents with the first patent valuation model and the at least a second patent valuation model.

7. The method of claim 6, further comprising:
creating a new patent valuation model based on first patent valuation model, the at least a second patent valuation model, and said modified at least one of the first set of the parameters and the at least a second set of the parameters;
storing the new patent valuation model; and
analyzing a second plurality of patents with the new patent valuation model.

8. A system for valuing patents comprising:
at least one processor that
receives information associated with a particular industry from at least one data source, wherein the information corresponds to an analysis related to intellectual property of the particular industry;
executes machine learning logic to utilize a neural network to recognize successful model combinations of a plurality of cognitive patent valuation models using the information as input, wherein utilizing the neural network includes analyzing each of the plurality of cognitive patent valuation models under a cognitive analysis of the neural network to determine and apply weighting parameters of each of the plurality of cognitive patent valuation models according to a predefined input goal, and wherein an output of the neural network is a ranked list of the plurality of cognitive patent valuation models according to the predefined input goal;
analyzes a plurality of patents with a first patent valuation model and at least a second patent valuation model of the plurality of cognitive patent valuation models selected from a library of computer models containing the plurality of cognitive patent valuation models, wherein the first patent valuation model has a first number of the parameters respectively weighted at a first weight and the at least a second patent valuation model has a second number of the parameters respectively weighted at a second weight, the second number different than the first number and the second weight different than the first weight;
detects a selection of a filter of the results of said analysis of the plurality of patents with the first patent valuation model and the at least a second patent valuation model;
generates a list of at least some of the plurality of patents based on said analysis of the plurality of patents with the first patent valuation model and the at least a second patent valuation model and the selected filter of the results of said analysis of the plurality of patents with the first patent valuation model and the at least a second patent valuation model; and
uses feedback data associated with the list of at least some of the plurality of patents to automatically and iteratively update the neural network over time to improve an accuracy of the neural network in recognizing the successful model combinations of the plurality of cognitive patent valuation models.

9. The system of claim 8, wherein the results of said analysis of the plurality of patents includes a first set of the plurality of patents associated with the first patent valuation model and at least a second set of the plurality of patents associated with the at least a second patent valuation model.

10. The system of claim 9, wherein the selected filter causes the generated list of the at least some of the plurality of patents to include only those of the plurality of patents that are included in both of the first set of the plurality of patents and the at least a second set of the plurality of patents.

11. The system of claim 9, wherein the selected filter causes the generated list of the at least some of the plurality of patents to include only those of the plurality of patents that are included in only one of the first set of the plurality of patents and the at least a second set of the plurality of patents.

12. The system of claim 8, wherein the at least one processor further detects a selection of the first patent valuation model and the at least a second patent valuation model from the plurality of cognitive patent valuation models.

13. The system of claim 8, wherein the first patent valuation model utilizes a first set of the parameters, and the at least a second patent valuation model utilizes at least a second set of the parameters, and further comprising modifying at least one of the first set of the parameters and the at least a second set of the parameters before the analyzing of the plurality of patents with the first patent valuation model and the at least a second patent valuation model.

14. The system of claim 13, wherein the at least one processor further:
creates a new patent valuation model based on first patent valuation model, the at least a second patent valuation model, and said modified at least one of the first set of the parameters and the at least a second set of the parameters;
stores the new patent valuation model; and
analyzes a second plurality of patents with the new patent valuation model.

15. A computer program product for valuing patents by one or more processors, the computer program product comprising a non-transitory computer-readable storage medium having computer-readable program code portions stored therein, the computer-readable program code portions comprising:
an executable portion that receives information associated with a particular industry from at least one data source, wherein the information corresponds to an analysis related to intellectual property of the particular industry;
an executable portion that executes machine learning logic to utilize a neural network to recognize successful model combinations of a plurality of cognitive patent valuation models using the information as input, wherein utilizing the neural network includes analyzing each of the plurality of cognitive patent valuation models under a cognitive analysis of the neural network to determine and apply weighting parameters of each of the plurality of cognitive patent valuation models according to a predefined input goal, and wherein an output of the neural network is a ranked list of the plurality of cognitive patent valuation models according to the predefined input goal;
an executable portion that analyzes a plurality of patents with a first patent valuation model and at least a second patent valuation model of the plurality of cognitive patent valuation models selected from a library of computer models containing the plurality of cognitive patent valuation models, wherein the first patent valuation model has a first number of the parameters respectively weighted at a first weight and the at least a second patent valuation model has a second number of the parameters respectively weighted at a second weight, the second number different than the first number and the second weight different than the first weight;
an executable portion that detects a selection of a filter of the results of said analysis of the plurality of patents with the first patent valuation model and the at least a second patent valuation model;
an executable portion that generates a list of at least some of the plurality of patents based on said analysis of the plurality of patents with the first patent valuation model and the at least a second patent valuation model and the selected filter of the results of said analysis of the plurality of patents with the first patent valuation model and the at least a second patent valuation model; and
an executable portion that uses feedback data associated with the list of at least some of the plurality of patents to automatically and iteratively update the neural network over time to improve an accuracy of the neural network in recognizing the successful model combinations of the plurality of cognitive patent valuation models.

16. The computer program product of claim 15, wherein the results of said analysis of the plurality of patents includes a first set of the plurality of patents associated with the first patent valuation model and at least a second set of the plurality of patents associated with the at least a second patent valuation model.

17. The computer program product of claim 16, wherein the selected filter causes the generated list of the at least some of the plurality of patents to include only those of the plurality of patents that are included in both of the first set of the plurality of patents and the at least a second set of the plurality of patents.

18. The computer program product of claim 16, wherein the selected filter causes the generated list of the at least some of the plurality of patents to include only those of the plurality of patents that are included in only one of the first set of the plurality of patents and the at least a second set of the plurality of patents.

19. The computer program product of claim 15, wherein the computer-readable program code portion further include an executable portion that detects a selection of the first patent valuation model and the at least a second patent valuation model from the plurality of cognitive patent valuation models.

20. The computer program product of claim 15, wherein the first patent valuation model utilizes a first set of the parameters, and the at least a second patent valuation model utilizes at least a second set of the parameters, and further comprising modifying at least one of the first set of the parameters and the at least a second set of the parameters before the analyzing of the plurality of patents with the first patent valuation model and the at least a second patent valuation model.

21. The computer program product of claim 20, wherein the computer-readable program code portion further include:
an executable portion that creates a new patent valuation model based on first patent valuation model, the at least a second patent valuation model, and said modified at least one of the first set of the parameters and the at least a second set of the parameters;
an executable portion that stores the new patent valuation model; and
an executable portion that analyzes a second plurality of patents with the new patent valuation model.

* * * * *

UNITED STATES PATENT AND TRADEMARK OFFICE
CERTIFICATE OF CORRECTION

| | | |
|---|---|---|
| PATENT NO. | : 11,379,887 B2 | |
| APPLICATION NO. | : 16/054739 | |
| DATED | : July 5, 2022 | |
| INVENTOR(S) | : Thomas J. Fleischman and Sue Hallen | |

It is certified that error appears in the above-identified patent and that said Letters Patent is hereby corrected as shown below:

On the Title Page

In the Inventors section ((72) Inventors:..."), "Sue Hallen, Elk Grove Village, IL (US)" should read "Susan Hallen, Elk Grove Village, IL (US)".

Signed and Sealed this
Fifteenth Day of August, 2023

Katherine Kelly Vidal
Director of the United States Patent and Trademark Office